July 15, 1924.

E. REICH ET AL 1,501,571

MEANS FOR CASTELLATING NUTS

Filed March 21, 1919  3 Sheets-Sheet 2

WITNESSES:
M. Hummel
E. Bohl

INVENTORS
ERNEST REICH
JOHN J. BOSSHARD
BY
Henry Blech
ATTORNEY

July 15, 1924.

E. REICH ET AL 1,501,571

MEANS FOR CASTELLATING NUTS

Filed March 21, 1919     3 Sheets-Sheet 3

WITNESSES:
M. Hummel
E. Bohl

INVENTORS
ERNEST REICH
JOHN J. BOSSHARD
BY Henry Hech
ATTORNEY

Patented July 15, 1924.

1,501,571

UNITED STATES PATENT OFFICE.

ERNEST REICH AND JOHN J. BOSSHARD, OF CHICAGO, ILLINOIS, ASSIGNORS TO THE HILL PUMP VALVE COMPANY, OF CHICAGO, ILLINOIS, A CORPORATION OF ILLINOIS.

MEANS FOR CASTELLATING NUTS.

Application filed March 21, 1919. Serial No. 284,137.

*To all whom it may concern:*

Be it known that we, ERNEST REICH, a citizen of Hungary (but having declared his intention of becoming a citizen of the United States), and JOHN J. BOSSHARD, a citizen of the United States, and both residing in Chicago, county of Cook, and State of Illinois, have invented a new and useful Improvement in Means for Castellating Nuts, of which the following is a specification.

The invention relates to means for castellating nuts.

It is an object of the invention to provide an improved punch and coacting die which will castellate nuts from the center outwardly and with the nut blank in horizontal position.

It is a further object of the invention to arrange the nut blanks in horizontal position shortly before the punch executes the cutting operation, so that the bottom of the slot formed by the punch is at right angles to the longitudinal axis of the nut blank.

It is a further object of the invention to provide a nut blank holder which maintains the nut blank in position to permit entry of the punch in the longitudinal hole of the nut blank, and which holder coacts in placing the nut blank with the longitudinal axis in horizontal position.

It is a further object of the invention to provide a nut blank holder which is so arranged that the arc of movement of the nut from the horizontal to the normally slanting position does not cause any distortion of the bottom of the slot when the punch recedes from the nut; in other words, the holder carries the nut so as to prevent jamming between the punch and nut during the oscillation of the latter.

A further object of the invention aims at the provision of a nut blank holder which is normally maintained in inoperative position by the action of a spring, the tension of which may be regulated to suit special requirements.

It is also an object of the invention to utilize a part of the stroke of the punch to turn the nut from the normally slanting to horizontal position.

A further object of the invention is to provide a punch with a curved cutting edge, the curvature of the edge being arranged to establish a gradual shearing or cutting of the wall of the nut blank, whereby not only a more accurate and perfect slotting of the nut blank is obtained, but the life of the punch is prolonged.

A further object of the invention aims at the provision of a punch which is of standard length, inexpensive to produce, and which may be easily reproduced when broken without any undue delay.

A further object aims at the provision of a die which is maintained in functional position by a wedge, thus rendering superfluous the employment of dowel pins, screws, etc., and facilitating quick exchange of the die whenever in the course of operation exchange becomes necessary.

It is a further object of the invention to provide a die which is of simple construction and therefore inexpensive as compared with the dies generally used in machines for castellating nuts.

It is also an object of the invention to provide for the simultaneous castellating of a plurality of nuts a plurality of punches and a plurality of dies, each being independently removable or adjustable to be exchanged or to be maintained in proper aligning position to produce slots in the nut blanks.

To the accomplishment of the foregoing and related ends, the invention consists of the means hereinafter fully described and particularly pointed out in the claims, the annexed drawings, and the following description, setting forth in detail certain mechanism embodying the invention which, however, constitutes but one of the various ways in which the principle of the invention may be used.

In the annexed drawings:

Fig. 11 is a fragmentary view of the lower part of the punch holder in the portion indicated by the arrow 11 in Fig. 1.

Figure 6:
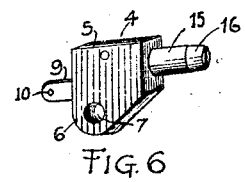
Fig. 6 is a perspective view of a nut blank holder.

Referring to the drawings, 1 designates a die shoe which is of oblong rectangular form and has a block 2 extending therefrom provided with a plurality of recesses 3 for the reception of nut blank holders, generally designated by 4. As indicated in Fig. 6, each nut blank holder comprises a body portion 5 of rectangular cross-section, and at the lower side the body portion terminates in a rounded extension 6, which is apertured, as at 7, for the passage of a pin 8, constituting the pivot pin for a plurality of holders. At the rear side of the body portion 5 an arm 9 extends therefrom, which is apertured, as at 10, to receive the end of a helical spring 11, the other end of which enters a bore 12 in the die shoe 1 and is secured therein to a lug 13 of a screw 14, constituting a plug for the bore. The body portion 5 of the nut blank holder is provided with a longitudinal bore for the reception of a pin 15, which is slotted at the outer terminal portion to provide the prongs 16, which maintain a space from one another sufficient for the passage of the punch, as will be hereinafter further described.

Figure 1:
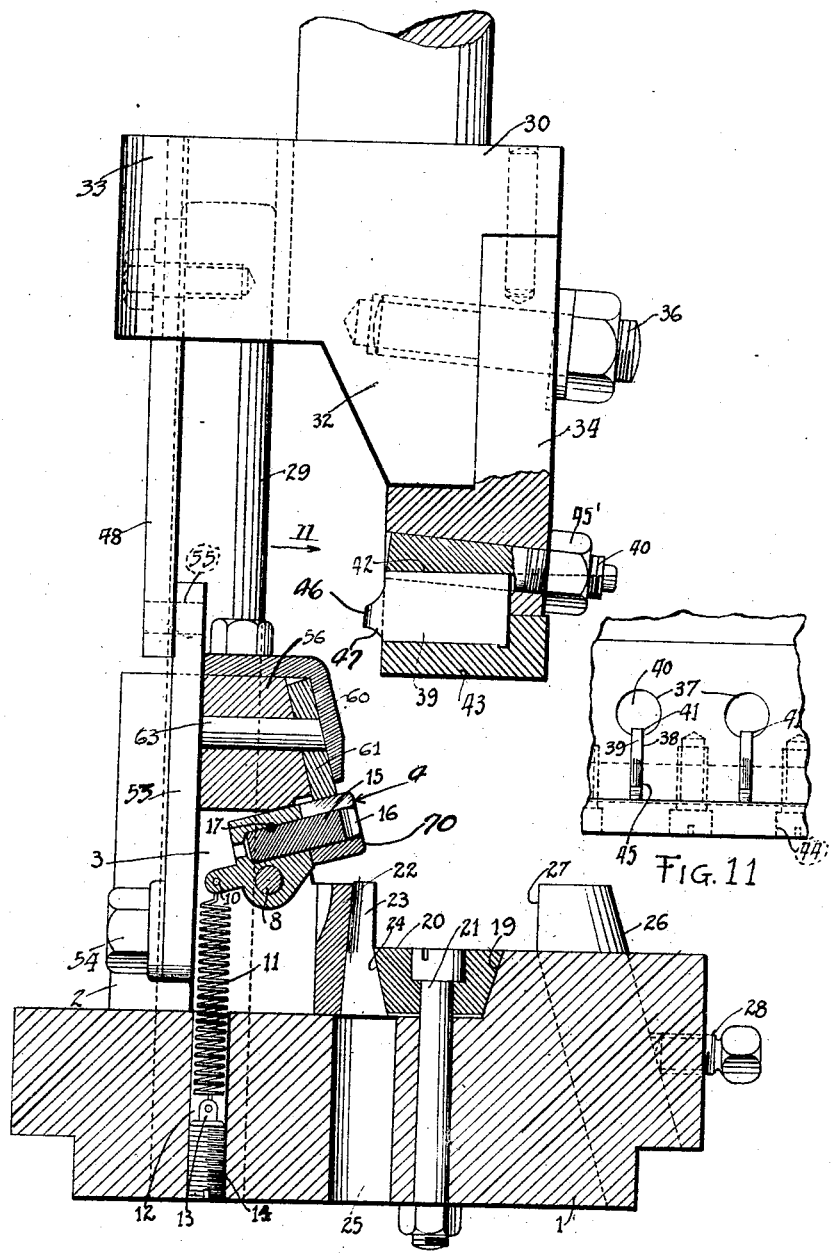
Fig. 1 is an elevational view of the machine constructed in accordance with our invention, with parts shown in section.

The pin 15 is secured in place by a pin 17, extending transversely to the longitudinal axis of the pin 15 and entering semi-circular recesses provided therefor in the body portion 4 and the pin 15, as is indicated in Fig. 1. The block 2 may be formed integral with or secured to the die shoe and is arranged at a predetermined distance from the beveled portion 19 of the die shoe, against which a wedge block 20 takes, which is maintained in position by a bolt 21 and thus may be adjusted whenever such adjustments become necesary for the securing of the die, presently to be described, in functional position.

The die, generally designated by 22, is arranged between the block 2 and the wedge 20 and is beveled at the rear portion, as at 24, to be maintained in position by wedge action. It is clear that the die 22 does not need any special fastening means, such as a dowel pin or a screw, in order to be maintained in proper position with respect to the coacting parts, but this wedge engagement by the block 20 suffices to maintain the die in true aligned position so as to enable the proper cutting of the slots in the nut blanks and the automatic discharge of the slugs cut out of the blanks when the nut blank is depressed on the die. The slugs which are cut out from the nut blanks are discharged through a slot 23, provided centrally of the die and at the rear side thereof, and each slot 23 registers with a vertical bore 25 provided in the die shoe and constitutes therewith an uninterrupted passage for said slugs to prevent clogging of the die and consequently impairment of the punching operation.

As indicated in Fig. 1, the die shoe 1 is provided with a pair of pins 26, which extend in oblique direction through the die plate in bores provided therefor, and each pin has a vertical face 27 juxtaposed to the die for a purpose hereinafter referred to. The pins 26 are arranged to be adjusted, for which purpose a set screw 28, extending horizontally through the die shoe, bears on the pin 26. To adjust a pin 26 the set screw 28 is loosened and after the adjustment has been made the set screw 28 is tightened in order to secure the pin in adjusted position. The die shoe is provided with upright guide pins 29, on which a punch holder, generally designated by 30, reciprocates; said punch holder being formed integral with the handle portion 31, whereby it is secured to a reciprocating element of the punch press (not shown), such as the reciprocating head or ram thereof.

The punch holder comprises a body portion 32, formed with apertured extensions 33, which receive the guide pins 29 and insure a correct reciprocating movement of the punch holder with respect to the coacting die. The punch holder 30 has secured thereto an angular punch plate 34, which is secured in proper position on the holder by the bolts 36, extending slantingly into the body portion 32 of the punch holder. The punch plate 34 is provided with a plurality of spaced apertures 37, the longitudinal axis of each of which forms an acute angle with a horizontal plane intersecting the topmost portion of the bore. Into each aperture a slot 38 opens of a width sufficient to permit insertion of a punch, designated by 39. Into each slanting bore 37 a pin or bolt 40 is introduced which is grooved, as at 41, which groove provides an abutment surface 42, constituting a seat for the top edge of the punch 39.

As indicated in Figs. 1 and 11, a locking plate 43 is secured to the punch plate 34 by a plurality of spaced screws 44, and each locking plate has a slot 45, which registers with the slot 38 and the groove 41 in the bolt 40 such that the vertical registry of the slots 45 and 38 and the groove 41 of the bolt permits the insertion of the punch 39. The provision of the pin 40 and the arrangement of the groove 41 with the horizontal bottom 42 entails a tight engagement of the punch, which is enhanced the farther the pin 40 is shifted toward the right hand side, as viewed in Fig. 1.

From the foregoing it follows that the insertion and removal of the punch 39 is extremely facilitated and possible with little loss of time, which plays a rôle not to be overrated in machines of this kind where quantity production is of the essence. The life of the punch, under favorable conditions and with the employment of the highest grade of material, is at best limited and requires frequent exchange of a worn or damaged punch for a new one. This is accomplished by loosening the nut 45' and shifting the bolt 40 toward the left hand side, as viewed in Fig. 1, so as to release the clamping engagement between the bolt, the punch, and the locking plate 43. The punch 39 may then be withdrawn and a new punch inserted, whereupon the nut is tightened, which causes the bolt 40 to move toward the right hand side and thereby forces the punch 39 into clamping engagement with the locking plate 43 and the contacting portion of the punch plate 34.

Figure 7:
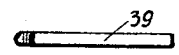
Figs. 7 and 8 are respectively top plan view and side view of the punch used for castellating nuts.
Figure 8:
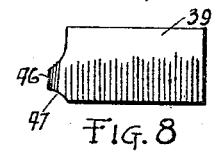

The punch indicated in detail in Figs. 7 and 8 is shown to have a rectangular form and is equipped at one side with a tongue 46, the lower side of which is curved, as at 47, so that in the execution of the punching operation the entire cutting edge is not at once placed in contact with the wall of the nut blank, but the cutting or shearing is performed gradually, so that not only a more exact punching or castellating of the nuts is obtained, but the life of the punch considerably enhanced. To the punch holder 32 a vertical plate 48 is secured by a pair of screws 49, and this plate is equipped with a cam slot 50, comprising the vertical edges 51 and the cam edges 52, of which, however, only one is shown in the fragmentary view of Fig. 3. The other cam edge is parallel to the one shown. A bar 53 is pivotally secured to the block 2 of the die shoe by a bolt 54 and carries at its upper end a pin 55, which extends into the slot 50 of the plate 48.

The members 48 and 53 constitute a part of the indexing mechanism which serves to impart to the nut blanks a partial rotation when one slot has been cut, this partial rotation being carried out throughout an arc of 60°, as there are six slots to be punched in a nut blank.

In superposed relation to the block 2, a block 56 is secured by means of the screws 18, and to the block 56 an angular shield 57 is fastened by means of the bolts 58, which hold the horizontal portion 59 of the shield 57 to the top surface of the block 56, while the downwardly extending portion 60 of the shield is spaced from the front face of the block 56 by a distance sufficient to receive therein the indexing plate 61, which has a plurality of recesses 65, into which the nut blanks 70 enter. The block 56 is formed with a curved slot 62 (Fig. 3) to permit a limited movement of a pin 63, interconnecting the bar 53 with the indexing plate 61 so as to provide for a unitary movement of the members 53 and 61.

The function of the indexing mechanism does not form a part of the invention and has been indicated only to render the operation thereof intelligible. When the punch holder is in the position as indicated in Fig. 1, the plate 48 is in raised position and the pin 55 is at the lowermost part of the lower cam edge (not shown in the drawing). In the reciprocation of the punch holder the link 53 is turned by reason of the fact that the pin 55 is shifted by the lower cam edge 52, and in view of the interlocking of the link 53 with the indexing plate 61, a turning movement is imparted to the latter, which causes rotation of the nut blanks throughout an arc of 60° so as to vary the position of the nuts to present new wall portions to the punch when the latter descends to castellate the blanks.

Attention is called to the fact that the cam edges 52 at the uppermost and lowermost portion, respectively, are recessed, as at 64, so as to provide a clearance for the pin 55, to avoid breakage of the parts in the course of operation of the machine.

The castellating of the nuts is effected in the following manner. Assuming the parts to be in the position indicated in Fig. 1, the punch holder, together with the punch, descends. Normally six punches are provided in the punch holder and a like number of carriers 4 carry six nuts, so that the longitudinal axis of each nut forms an acute angle with the horizontal plane intersecting the axis of the pivot pin 8. Upon descent of the punches 39, the tongue 46 enters the center bore of the blank, the tongue projecting between the prongs 16 of the pin 15, on which the blank is disposed. The continued descending movement of the punch causes an oscillation of the carriers 4 downwardly with the axis of the pivot pin 8 as the center of rotation, and at this time the cam edge 52 causes the index plate 61 to be shifted toward the right hand side, as viewed from the front of the machine; but in view of the fact that the nuts are engaged by the punch and are spaced from the indexing plate 61, the movement of the bar is an idle one.

Figures 2, 3:
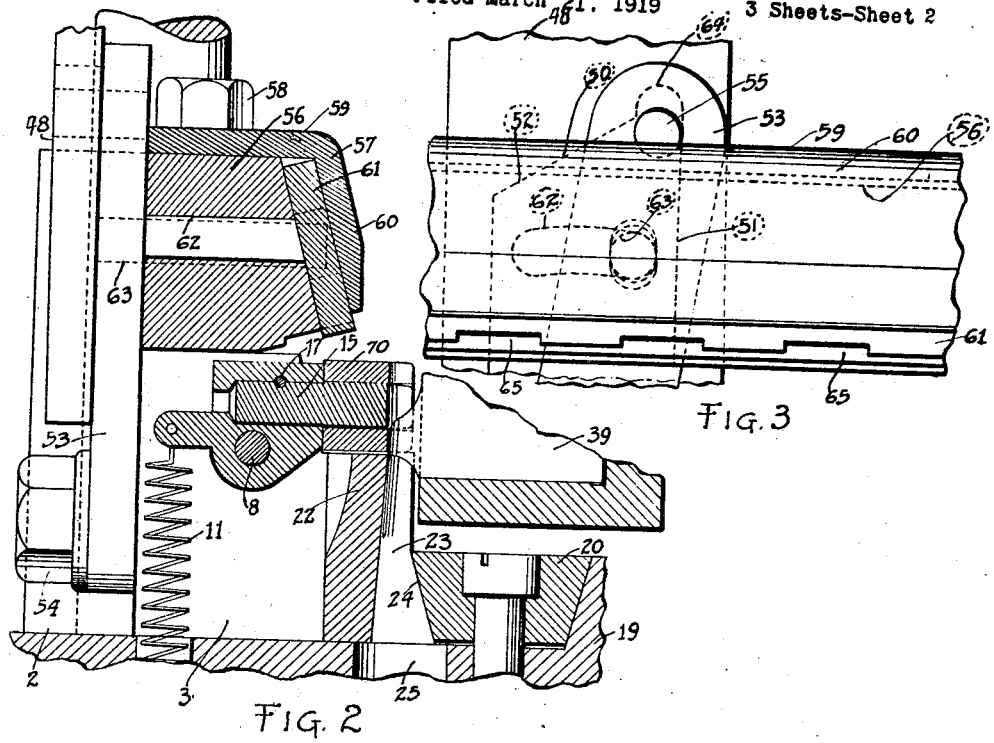
Fig. 2 is a view similar to Fig. 1 on an enlarged scale, showing the punch approaching its lowermost end position and at the time when the slot is being punched.
Fig. 3 is a side view of parts shown in Fig. 2 to indicate the indexing means employed for the nut blanks.
Figure 4:
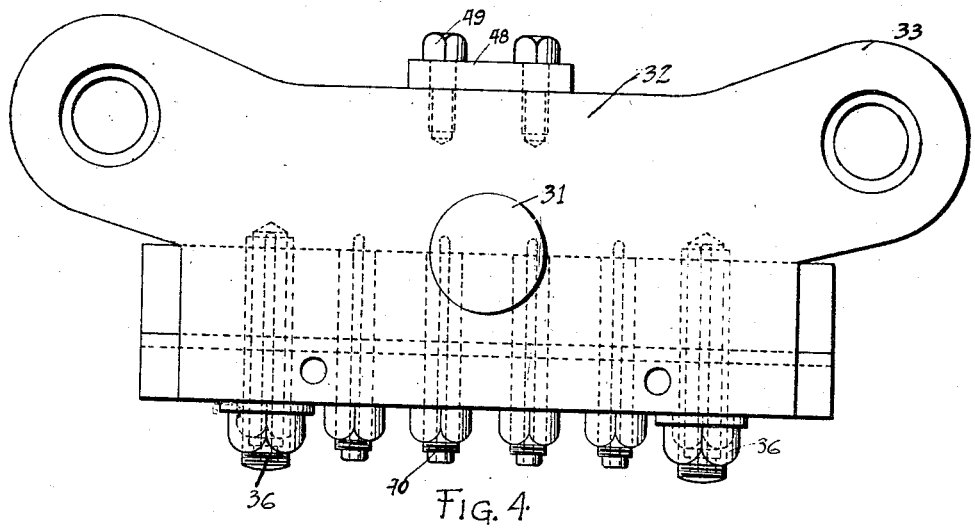
Fig. 4 is a top plan view of the punch holder.
Figure 5:
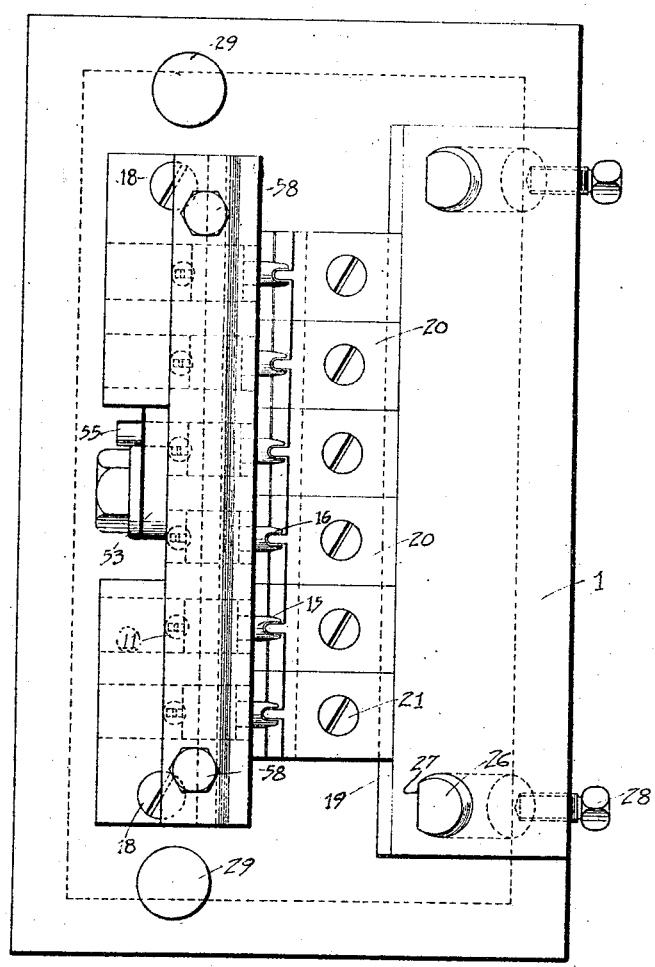
Fig. 5 is a top plan view of the die.

In the continued descent of the punch holder and the punch, the rotation or oscillation of the carriers together with the nut blanks is limited by the abutment with the die 22, while the front shoulder of the punch continues in a downward movement and executes a slotting operation by forcing the cutting edge 47 of the punch nose 46 through the wall of the nut blank, the latter being at that time in true horizontal position, so that the slot which is cut by the punch 39 has a bottom at right angles to the longitudinal axis of the nut blank. This stage of operation is illustrated in Fig. 2, where the punch has cut through the wall of the nut blank.

The formation of the slot by the punch releases the nut blank 70, and under the action of the spring 11 the carrier is thrown upwardly and into recesses 65 of the indexing bar 61.

Attention is called to the fact that the pivot pin 8, constituting the center of rotation of the carriers, is arranged below the axis of the nut holding pin 15, so that at the time of punching, when the pin is in horizontal position (Fig. 2), the nut blank is close to the punch, and any continued movement of the blank downwardly (if this were possible) or the return movement entails a quick receding from the punch, avoiding thereby a binding effect, which would be possible if the pin 15 would rotate about a point on its longitudinal axis.

The descent of the punch having reached the lowermost position, the upstroke begins. In the upper movement of the punch the cam slot 50 of the plate 48 shifts the link 53 towards the left hand side, as viewed from the front of the machine, and this movement of the bar 53 is common to the indexing plate 61, which thus is shifted a like amount toward the left hand side. At this time, however, the nut blanks 70 are within the recesses 65 and the indexing plate 61 is subjected to a partial rotation of 60°, so that in the following descent of the punches a new portion of the nut wall is presented to the punch for castellation.

Figure 9:
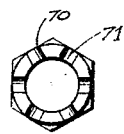
Figs. 9 and 10 are respectively top view and section of a castellated nut.
Figure 10:

From the foregoing it is obvious that the punches have intermittently a common movement with the carriers and nut blanks and alternately a relative movement thereto; the common movement being effected by entry of the punch into the longitudinal bore of the nuts, whereby the latter are forced to participate in the movement of the punch until the abutment of the nut blank against the die releases the movement of the nut blank but permits continued descent of the punch, giving rise to the punching of the slots at a time when the nut blanks are in horizontal position, so that the bottom of the slots punched are at right angles to the longitudinal axis of the blanks. In Figs. 9 and 10 the castellated nut 70 has been shown provided with the slots 71, the bottoms of which are at right angles to the longitudinal axis.

The guide pins 29 of the die shoe always insure an accurate descent of the punch with respect to the cooperating nut blank carrier and the die. In order to assist in the gaging of the punch holder, the pins 26 are provided, the vertical face 27 of which is adapted to engage the rear side of the locking plates 43. These pins 26 not only have the office of guiding the rear side of the punch holder, but they also take up a certain amount of side thrust which is set up upon the punching of the nut blanks.

The accompanying drawings illustrate one preferred embodiment of the invention. The structural details which make up the machine; the arrangement of the parts with respect to one another; the construction of the parts and other features of the machine, are susceptible of variation within wide limits. The machine as presented is merely indicative of the principle on which the invention is predicated, and for this reason it is our intention not to limit ourselves to the structural features as shown, but to claim the invention as broadly as the state of the art permits.

We claim:

1. In a machine of the class described, a vertically reciprocating punch, a carrier normally holding nut blanks in slanting position, to permit entry of the punch into the nut bore, a die arresting the movement of the nuts when the latter have the longitudinal axis in horizontal position, and wedging means for maintaining said die in proper position.

2. In a machine of the class described, a vertically reciprocating punch, a carrier for normally holding nut blanks in slanting position, to permit entry of the punch into the nut bore, a die arresting the movement of the nut when the latter has its longitudinal axis in horizontal position, said die being formed with a slanting face, and a wedge engaging the slanting face of the die to maintain the latter in proper position.

3. In a machine of the class described, a vertically reciprocating punch, a carrier for normally holding nut blanks in slanting position, to permit entry of the punch into the nut bore, a die arresting the movement of the nut when the latter has its longitudinal axis in horizontal position, said die being formed with a slanting face, and an adjustable wedge engaging the slanting face of the die to maintain the latter in proper position.

4. In a machine of the class described, a vertically reciprocating punch holder, a punch arranged therein, a movable carrier normally holding nut blanks in slanting position, to permit entry of the punch into the nut bore, a die shoe, a die secured to said shoe for arresting the movement of the nut when the latter has its longitudinal axis in horizontal position, pins extending vertically from the die shoe to guide said punch holder, and additional guiding means for said punch holder.

5. In a machine of the class described, a vertically reciprocating punch holder, a punch arranged therein, a movable carrier normally holding nut blanks in slanting position, to permit entry of the punch into the nut bore, a die shoe, a die secured to said shoe for arresting the movement of the nut when the latter has its longitudinal axis in horizontal position, pins extending vertically from the die shoe to guide said punch holder, and additional adjustable guiding means for said punch holder secured to said die shoe.

6. In a machine of the class described, a vertically reciprocating punch holder, a punch arranged therein, a movable carrier normally holding nut blanks in slanting position, to permit entry of the punch into the nut bore, a die shoe, a die secured to said shoe for arresting the movement of the nut when the latter has its longitudinal axis in horizontal position, pins extending vertically from the die shoe to guide said punch holder, and additional pins secured to said shoe for guiding the punch holder during the punching operation.

7. In a machine of the class described, a vertically reciprocating punch holder, a punch arranged therein, a movable carrier normally holding nut blanks in slanting position, to permit entry of the punch into the nut bore, a die shoe, a die secured to said shoe for arresting the movement of the nut when the latter has its longitudinal axis in horizontal position, pins extending vertically from the die shoe to guide said punch holder, additional pins extending obliquely through said die shoe, and means for adjusting said pins.

8. In a machine of the class described, a vertically reciprocating punch holder, a punch arranged therein, a movable carrier normally holding nut blanks in slanting position, to permit entry of the punch into the nut bore, a die shoe, a die secured to said shoe for arresting the movement of the nut when the latter has its longitudinal axis in horizontal position, pins extending vertically from the die shoe to guide said punch holder, additional pins extending obliquely through said die shoe and having vertical faces at the protruding end, and means for adjusting said pins.

9. In a machine of the class described, a carrier for normally maintaining nut blanks in slanting position, a punch adapted to enter the center bore of the nuts and oscillate the same into horizontal position, and means for supporting the carrier so as to prevent jamming between the punch and nut during the oscillation of the latter.

10. In a machine of the class described, a pivotal carrier for normally maintaining nut blanks in slanting position, a punch adapted to enter the center bore of the nuts and oscillate the same into horizontal position, the arc of movement of the nut being such as to prevent distortion of the bottom of the slot when the punch recedes from the nut.

11. In a punching machine a plurality of punches, two object engaging members, one movable from and toward the other, for positioning a row of objects, the relatively stationary member having formations for turning said objects to present new portions to the punches, spring means for pressing the relatively movable member toward the relatively stationary member, and mechanism for effecting relative movement of the relatively stationary member to turn the objects to present new portions thereof to the punches during the time that the punches are free of the objects, and to reset the member preparatory to another turning movement while the punches are engaged with the objects.

12. A punching machine including a punch, two object engaging members for positioning an object, one of said members having a formation for turning the object to present a new portion thereof to the punch, and mechanism for effecting relative movement between the member having the object turning formation and the object engaged thereby to turn the object during the time that the punch is free of the object and to cause an opposite relative movement between said member and the object for the purpose of resetting said member preparatory to another turning movement while the punch is engaged with the object.

13. A punching machine including a plurality of punches, two object engaging members for positioning a row of objects, one of said members having formations for turning said objects to present new portions to the punches, and mechanism for effecting relative movement between the row of objects and the member having the formations to turn the objects when the punches are free thereof and to produce an opposite relative movement thereof when the punches are engaged with the objects.

In witness whereof we affix our signatures.
ERNEST REICH.
JOHN J. BOSSHARD.